United States Patent [19]
Shaffer

[11] Patent Number: 6,002,751
[45] Date of Patent: *Dec. 14, 1999

[54] SYSTEM AND METHOD FOR IMPROVED MAIL NETWORKING

[75] Inventor: Shmuel Shaffer, Palo Alto, Calif.

[73] Assignee: Siemens Information and Communication Networks, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/748,866

[22] Filed: Nov. 13, 1996

[51] Int. Cl.$^6$ ................................................. H04M 1/64
[52] U.S. Cl. ..................................... 379/88.18; 379/88.13
[58] Field of Search .............................. 379/67, 88, 89, 379/88.13, 88.14, 88.15, 88.18

[56] References Cited

U.S. PATENT DOCUMENTS

| | | | |
|---|---|---|---|
| 4,790,009 | 12/1988 | Kepley et al. | 379/88 |
| 5,029,199 | 7/1991 | Jones et al. | 379/89 |
| 5,623,538 | 4/1997 | Petty | 379/67 |
| 5,687,220 | 11/1997 | Finnigan | 379/89 |

Primary Examiner—Fan S. Tsang

[57] ABSTRACT

A method and a system are provided for improved mail networking. A call transfer condition is first detected. A call transfer condition occurs immediately before a call is transferred to a first mail messaging system (56). Communication then occurs between local call processor (20) and remote call processor (60). The system determines if a call transfer is supported by a common protocol of both the second mail messaging system (16) and the first mail messaging system (56). If a common protocol is supported, the call is transferred to local voice mail system (16). The user (12) then provides a message which is received by the second mail messaging system (16). This message is automatically forwarded to the first mail messaging system (56) at a later time.

23 Claims, 5 Drawing Sheets

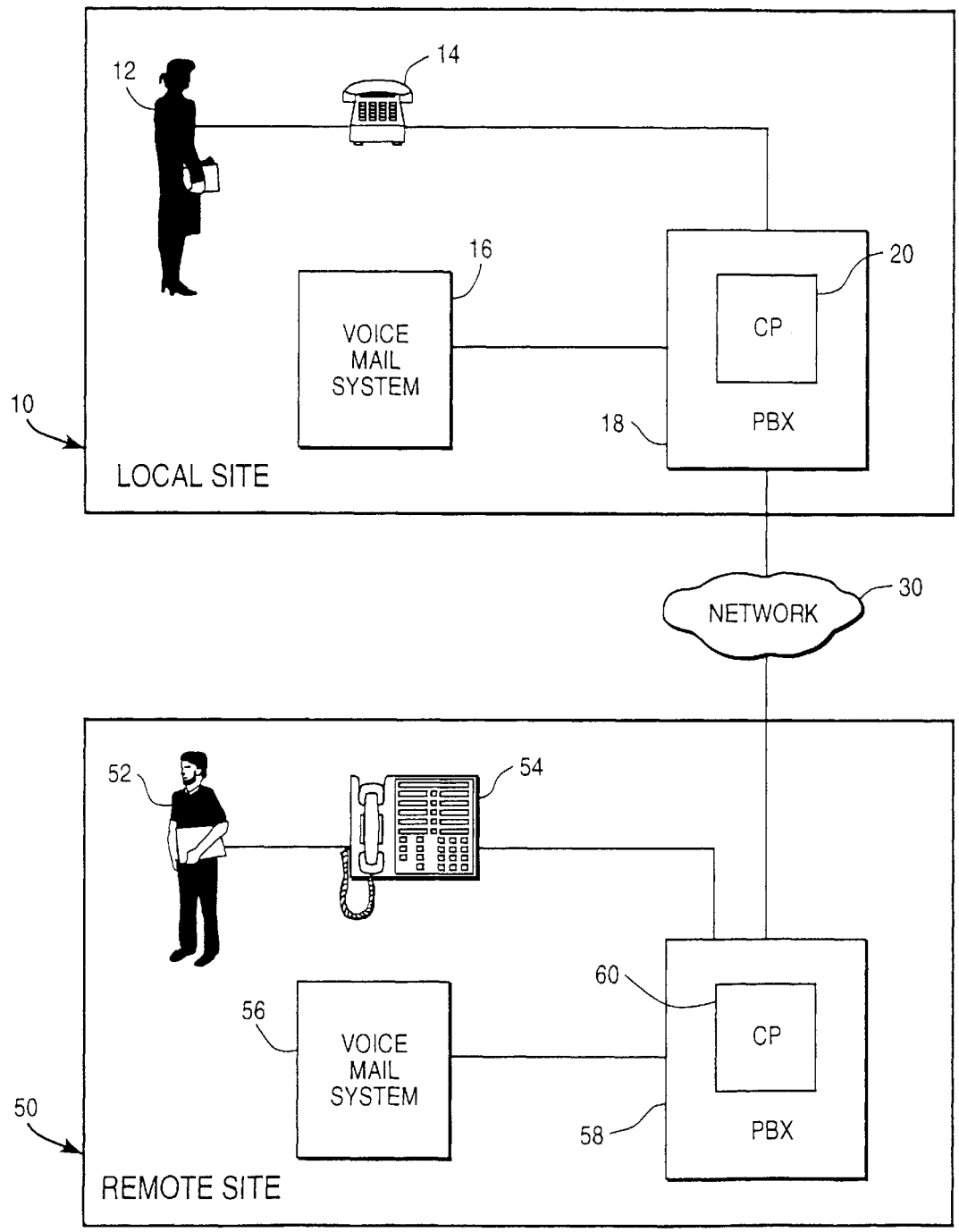
FIG_1

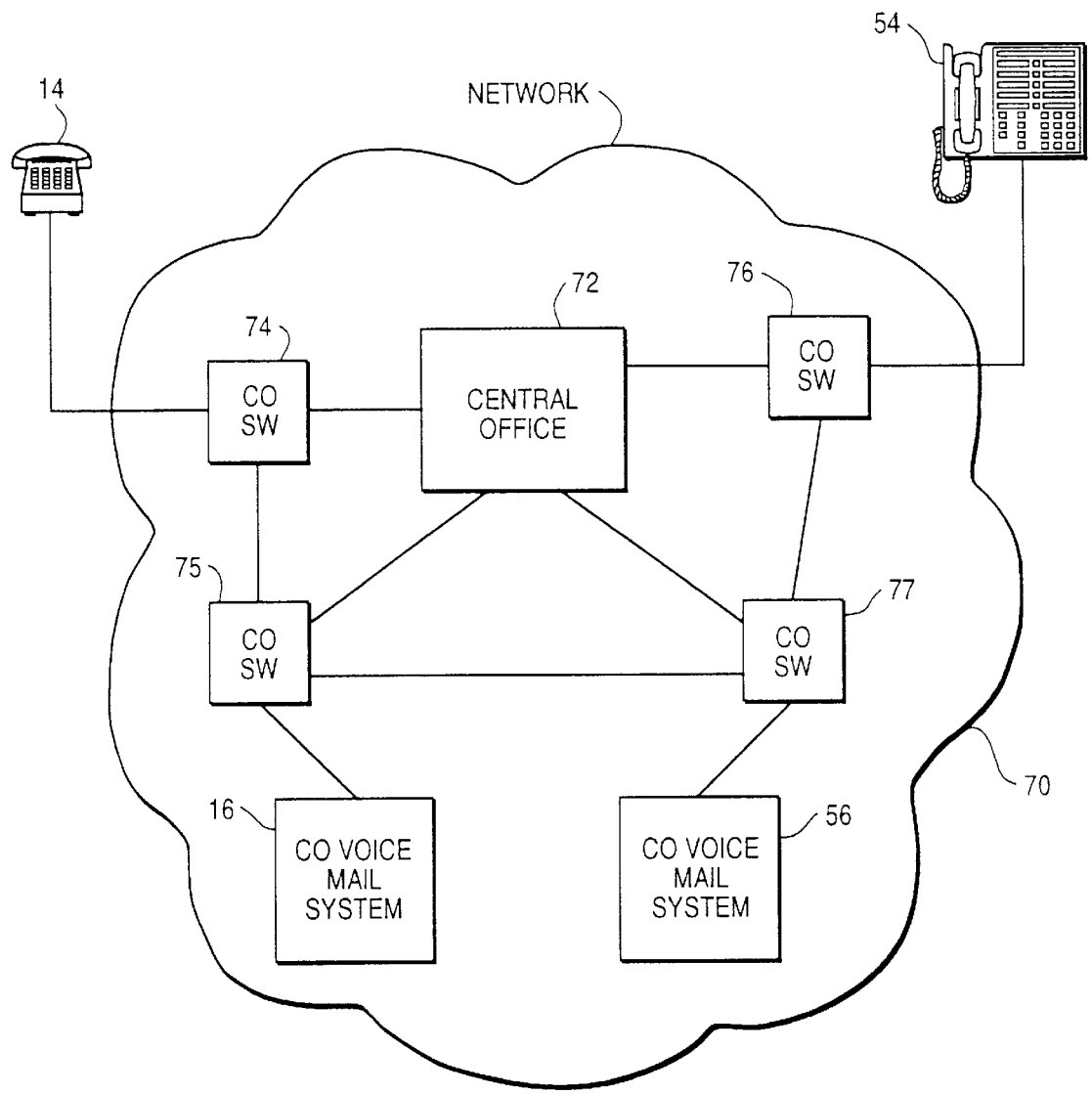
FIG_2

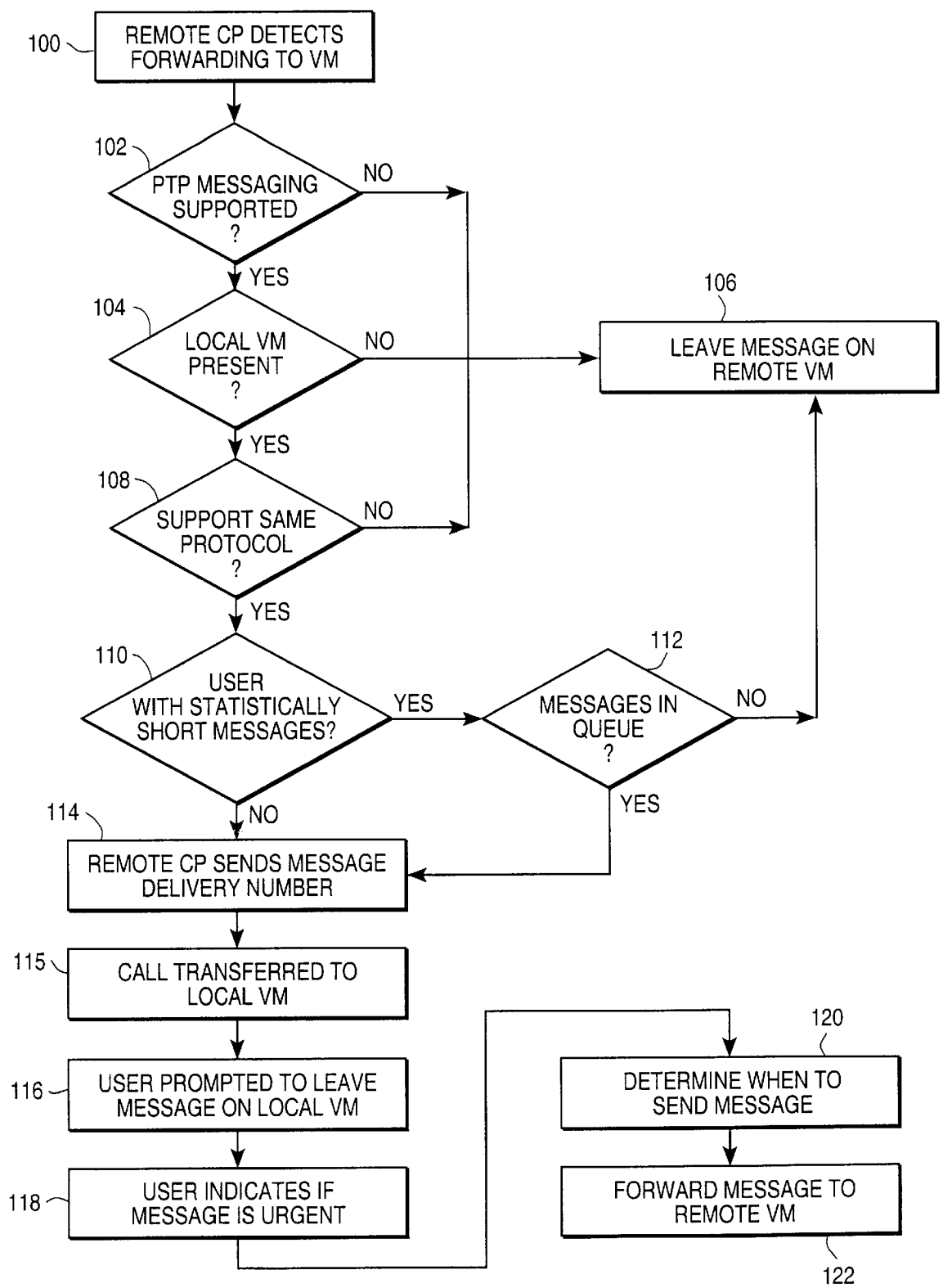
FIG_3

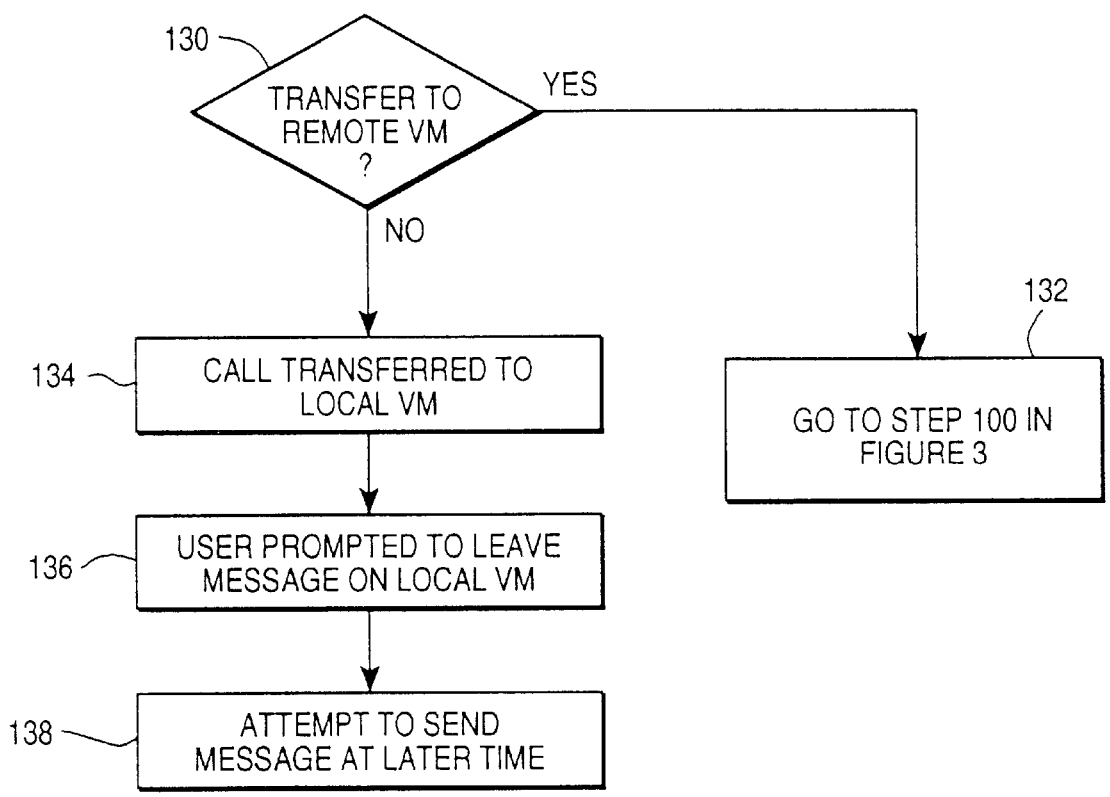
FIG_4

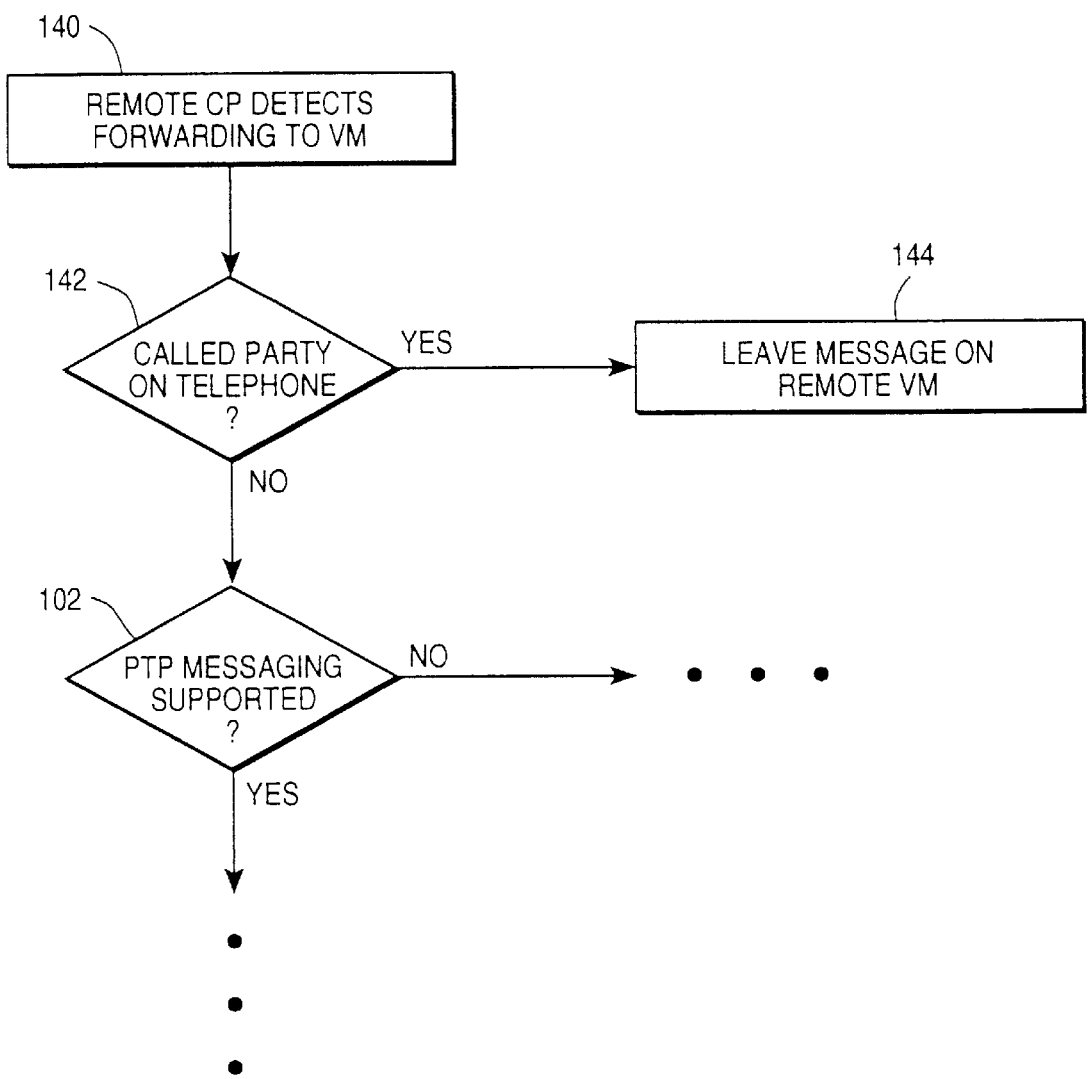
FIG_5

SYSTEM AND METHOD FOR IMPROVED MAIL NETWORKING

BACKGROUND OF THE INVENTION

1. Field of the Invention

The invention relates to providing an improved mail networking scheme, and more particularly to a PBX (private branch exchange) or central office system facilitated mail networking system and method.

2. Description of the Related Art

Telephone messaging systems are common in both homes and the workplace. Currently, a user can call someone on another PBX (private branch exchange) via a public or a private network. With currently available systems, if the remote user (i.e., the user being called) does not answer or if the remote telephone is busy, the telephone call is forwarded to a remote voice mail system. This assumes that a remote voice mail system is present and functional. After listening to an outgoing announcement, the caller can leave a message for the called individual. When the remote voice mail system has a different user interface than that of the local voice mail system, the caller must listen to the whole outgoing announcement before the caller can start recording a message. Furthermore, a user/caller cannot edit, delete or otherwise control a recorded message when a different user interface is provided by the remote voice mail system.

Voice messaging (or voice mail) networking is a feature that enables users to record messages on their voice mail messaging systems for later delivery to users on other voice mail messaging systems. This is possible because the two voice mail messaging systems are connected via the voice messaging networking. Most voice mail systems can network with other voice mail systems by using the Audio Messaging Interchange Specification (AMIS) protocol which has been accepted by the voice mail industry. In the digital environment, x.400 can be used for digitized messaging. In addition, major vendors in the voice mail industry have developed their own proprietary voice mail networking protocols. To use the AMIS protocol, a user must have the message delivery telephone number for the remote voice mail system. Unfortunately the message delivery telephone number is usually unknown. Thus, to use voice messaging networking, users must know the message delivery telephone number of the voice mail system associated with the person they wish to call.

Voice mail networking is a cost saving feature that is underutilized because of lack of user understanding, lack of tariff information and/or lack of information about the corporate voice mail network. This underutilization results in higher communication costs.

As stated above, one drawback of current systems is that the user must know the message delivery number. In a private voice mail network, the message delivery number is usually entered into the system by a network administrator. In a public AMIS network or a x.400 network, the user has to address each message with the message delivery number of the remote messaging system. The developers of the AMIS protocol envisioned each person's business card containing their voice mail delivery number in addition to a regular telephone number. This vision never became a reality.

It is desirable to have a system which increases the utilization of the voice mail networking feature without burdening users with the need to know and enter the message delivery number or any other number (e.g., a networking access prefix number) of the remote voice mail system. This would result in reduced communication costs.

SUMMARY OF THE INVENTION

According to the invention, a method and a system are provided for improved mail networking. A call transfer condition is first detected. A call transfer condition occurs immediately before a call is transferred to a remote mail messaging system. Communication then occurs with the remote mail messaging system. The system determines if a common messaging protocol is supported by the local mail messaging system and the remote mail messaging system. If a common messaging protocol is supported, the call is transferred to the local mail messaging system. The user then provides a message which is deposited in the local mail messaging system. This message is automatically forwarded to the remote mail messaging system at a later time.

BRIEF DESCRIPTION OF THE DRAWINGS

FIG. 1 illustrates an overall environment for a first embodiment of the present invention;

FIG. 2 illustrates an overall environment for a second embodiment of the present invention;

FIG. 3 is a process flowchart for an embodiment of the present invention;

FIG. 4 is a process flowchart for a condition when the remote voice mail system is unavailable; and FIG. 5 is a process flowchart for a condition when the called party is using the remote telephone.

DETAILED DESCRIPTION

The present invention provides a PBX (private branch exchange) or central office system facilitated mail networking system and method which increases the utilization of the mail networking feature. To provide the present invention, information is exchanged between a local PBX, a remote PBX (or a local central office, a remote central office), a local mail system and a remote mail system. As a result, when leaving a message, the user is provided with a familiar user interface. Thus, the user can edit, delete or otherwise control a recorded message. The below examples focus on the voice mail messaging environment, but the present invention can be used for voice mail messaging or any other type of multimedia messaging (e.g., video messaging). When the invention is used for multimedia messaging, a multimedia terminal, rather than a telephone, is utilized.

FIG. 1 illustrates an overall environment for a first embodiment of the present invention. In the preferred embodiment, local site 10 includes caller 12, local telephone 14, local voice mail system 16, local PBX 18 and local call processor 20. There is a logical association between local voice mail system 16 and local PBX 18. In this example, local voice mail system 16 and local PBX 18 are in the same location. As an alternative, local voice mail system 16 and local PBX 18 can be in different physical location. A PBX is a telecommunications switching system which is usually owned by a business. A PBX acts as an in-house central office with advanced features and capabilities. A central office is where the central office switch is located. A central office switch provides power, routing and signaling features for users.

Remote site 50 includes called individual 52, remote telephone 54, remote voice mail system 56, remote PBX 58 and remote call processor 60. Again, remote voice mail system 56 and remote PBX 58 can be in different physical locations. In this arrangement, caller 12 uses local telephone 14 to place a telephone call to called individual 52 on remote telephone 54. If remote telephone 54 is in use or if remote telephone 54 is not answered, the call is transferred to local voice mail system 16 rather than to remote voice mail system 56. Therefore, caller 12 can leave a message for called individual 52 on a familiar voice mail system 16. The message is later delivered by local voice mail system 16 to remote voice mail system 56.

FIG. 2 illustrates an overall environment for a second embodiment of the present invention. In this embodiment, a central office switch is utilized instead of a PBX. The central office in this example can be a currently available central office used for voice mail communication. PSTN cloud 70 connects local telephone 14, local voice mail system 16, remote telephone 54 and remote voice mail system 56. PSTN cloud 70 contains one of more central offices 72 along with multiple central office switches 74–77. Central office 72 and central office switches 74–77 are used to route communications between local telephone 14, local voice mail system 16, remote telephone 54 and remote voice mail system 56. Local telephone 14 may be in a different physical location from local voice mail system 16. Similarly, remote telephone 54 may be in a different physical location from remote voice mail system 56. The local mail system is logically associated with central office 72, and remote voice mail system 56 is logically associated with the remote mail system.

FIG. 3 is a process flowchart for an embodiment of the present invention. This process begins after a telephone call has been placed to called individual 52 shown in, for example, FIG. 1. As stated above, if remote telephone 54 is in use or if remote telephone 54 is not answered, the telephone call is normally transferred to remote voice mail system 56. The present invention alters this process. At step 100, remote call process 60 detects a condition that would normally result in forwarding the telephone call to remote voice mail system 56. As a result, remote call process 60 engages in peer to peer (PTP) communication with local call processor 20 at step 102 to determine if the PTP protocol is supported. If PTP protocol is not supported, remote PBX 58 forwards the telephone call to remote voice mail system 56 at step 106. If PTP protocol is supported, the system moves to step 104. At step 104, the system determines whether local voice mail system 16 is present. This is done through PTP communication between the call processors. If local PBX 18 does not have local voice mail system 16 connected to it or if the associated voice mail system is not available, remote PBX 58 forwards the telephone call to remote voice mail system 56 at step 106. If local PBX 18 has local voice mail system 16 connected to it, the system moves to step 108.

At step 108, the system uses the PTP communication to determine whether local voice mail system 16 and remote voice mail system 56 support the same voice mail networking protocols. Usually, for voice mail systems, both systems will support at least the AMIS protocol described above. In addition, both systems may support the same proprietary voice mail networking protocol. For example, both local voice mail system 16 and remote voice mail system 56 could be provided by the same voice mail system manufacturer such that their standard networking protocol is the same. If no common voice mail networking protocol is supported, remote PBX 58 forwards the telephone call to remote voice mail system 56 at step 106. If a common voice mail networking protocol is supported the system moves to step 110 or to step 114. Step 110 is optional.

At step 110, the system checks a historical statistical database associated with caller 12. This database reveals whether caller 12 normally leaves relatively short messages (e.g., messages which are almost always less then 15 seconds). For this optional step, the system must monitor the length of users' calls to determine which users leave relatively short messages. Thus, the system can gather statistics related to each users' length of calls. If the user does not normally leave short messages, the system moves to step 114. If the user does normally leave relatively short messages, the system moves to step 106 or step 112. Step 112 is optional. At step 106, the relatively short message is left on remote voice mail system 56. Thus, the system can opt to let caller 12 leave a message on remote voice mail system 56 based on the average length of a caller's messages.

At optional step 112, the system checks the queue of messages in local voice mail system 16. If one of more messages are in the queue waiting for delivery to remote voice mail system 56, the system moves to step 114 to take advantage of the upcoming delivery of messages to remote voice mail system 56. If no messages are in the queue for remote voice mail system 56, the system moves to step 106 and leaves a message on remote voice mail system 56.

At step 114, when both voice mail systems support a common voice mail networking protocol, remote call processor 60 sends local call processor 20 the message delivery telephone number for remote voice mail system 56. The telephone call is then forwarded by local call processor 20 to local voice mail system 16, and local call processor 20 provides local voice mail system 16 with the message delivery telephone number for remote voice mail system 56. At step 115, the telephone call is transferred to local voice mail system 16. At step 116, the user is prompted to leave a message for called individual 52 on local voice mail system 16. Caller 12 usually feels more comfortable leaving a message on a voice mail system with a familiar user interface. Thus, the user can easily modify the outgoing message.

At optional step 118, the user is given the option of sending a message urgently (without the associated cost savings) or waiting for the next delivery time. At step 120, the system determines when to send the message. This determination can be based on inputs from the user (e.g., request for urgent delivery), any other messages in the queue for delivery to the same remote voice mail system, and/or the varying connection cost for use of public switching telephone network (PSTN) 30. At step 122, the message is forwarded to remote voice mail system 56 over PSTN 30. As an alternative, PSTN 30 can be any communication network, including a single line.

While FIG. 3 shows a process for an environment utilizing PBXs, the process in FIG. 3 can also be applied to environments utilizing central office switching (as shown in FIG. 2). Thus, the present invention can be used when no PBXs are present and central office switching is used for communication. Moreover, as stated above, the present invention can be applied to any multimedia messaging systems. The above examples involve voice mail messaging systems, but the present invention is not limited to voice mail.

In another embodiment of the invention, the system responds to a condition when the remote voice mail system is unavailable. This response is independent of the other conditions described above. FIG. 4 is a process flowchart for a condition when the remote voice mail system is unavailable. This process flowchart is utilized when (1) there is no remote voice mail system present or (2) the remote voice mail system is down. In this arrangement, a transfer to the remote voice mail system does not occur. Rather, remote telephone 54 just continually rings. At step 130, the system waits for a transfer to the remote voice mail system. If the transfer occurs, the system moves to step 132. At step 132, the system begins the process set forth in FIG. 3. If the transfer does not occur, the system moves to step 134. At step 134, the call is transferred to local voice mail system 16. At step 136, the user is prompted to leave a message on local voice mail system 16. At step 138, local voice mail system 16 later attempts to deliver the message to called party 52 by calling remote telephone 54 again.

In another embodiment of the present invention, the transfer of the telephone call to local voice mail system 16 only occurs when called party 52 is not using remote telephone 54. FIG. 5 is a process flowchart for a condition when the called party is using the remote telephone. At step 140, remote call processor 60 detects a condition that would normally result in forwarding the telephone call to remote voice mail system 56. At step 142, the system determines if called party 52 is using remote telephone 54. This may be done by detecting an automatic and immediate transfer to remote voice mail system 56, or via monitoring done by remote call processor 60. If called party 52 is using remote telephone 54, the system moves to step 144. At step 144, the telephone call is transferred to remote voice mail system 56. If called party 52 is not using remote telephone 54, the system moves to step 102. Step 102 and the following steps (104–122) are set forth in FIG. 3 and the related descriptions above. In this embodiment, the message is left on the remote voice mail system when the called party is using the telephone because the called party may receive the message sooner. This embodiment is optional and, in the preferred embodiment, may be manually turned off or on by caller 12.

The present invention can be activated at all times or only when the remote call processor notifies the local call processor that the normal business hours are over. Thus, the present invention can be used during specific periods of time. In addition, the present invention can be activated for a busy signal situation and/or for a no answer situation.

The present invention provides improved use of voice mail messaging resulting in a cost savings. For example, cost is reduced because of the shift in time when using long distance networking. Thus, the message(s) can be forwarded to the remote voice mail system at a time when long distance networking rates are lower (e.g., after 7:00 pm). Cheaper lines of longer bandwidth or the Internet can also be used to reduce costs. In addition, multiple messages can be sent to one remote voice mail system together. In this arrangement, only one establishment cost is charged for the telephone call to the remote voice mail system. Finally, time of line use can be reduced, resulting in a reduced cost, if voice compression is utilized.

I claim:

1. A method for improved message delivery from a sending messaging system to a receiving messaging system, comprising the following steps:
    a) the sending system determining if a call transfer is supported by a peer to peer protocol of the sending messaging system and the receiving messaging system; and
    b) when the common protocol is supported, the sending system performing the following substeps:
        (b)(1) storing a message in the sending messaging system;
        (b)(2) determining when to initiate forwarding of the message to the receiving messaging system; and
        (b)(3) automatically initiating forwarding of the message from the sending messaging system to the receiving messaging system.

2. The method for improved message delivery of claim 1, further comprising the steps of:
    collecting statistics related to an average length of messages sent from a user; and
    using the statistics to determine whether to forward the call to the receiving messaging system.

3. The method for improved message delivery of claim 1, wherein the storing, the determining when to initiate forwarding, and the initiating of forwarding occur only during a predetermined period of time.

4. The method for improved message delivery of claim 1, wherein the storing and the initiating of forwarding occur only when the sending messaging system already has a message for the receiving messaging system.

5. The method for improved message delivery of claim 1, wherein the forwarding utilizes a mail message delivery number.

6. The method for improved message delivery of claim 1, further comprising the step of automatically storing the call at the sending message system and skipping step (b) when the receiving messaging system is unavailable.

7. The method for improved message delivery of claim 1, wherein the call is at least one of a telephone call and a multi-media call.

8. The method for improved message delivery of claim 1, wherein the determining is based on at least one of inputs from a caller, whether there are any other messages in a queue for delivery to the receiving messaging system, whether a called party is using a telephone, whether a called party is using a multimedia terminal and connection costs.

9. The method for improved message delivery of claim 1 in which one of the messaging systems is a business messaging system.

10. The method for improved message delivery of claim 9 in which the business messaging system is a PBX system.

11. The method for improved message delivery of claim 1 further comprising the step of the sending system detecting a message transfer condition at the receiving messaging system.

12. A system for improved voice mail networking, comprising:
    a first telephone, a first user being capable of placing a telephone call from the first telephone;
    a first voice mail messaging system, the first telephone being coupled to the first voice mail messaging system;
    a second telephone, the first user being capable of calling the second telephone via a telephone network, the second telephone being associated with a second user;
    a second voice mail messaging system, the second telephone being coupled to the second voice mail messaging system;
    connecting means for automatically transferring the telephone call to the first voice mail messaging system rather than the second voice mail messaging system when a peer to peer protocol is supported; and
    a processor at the first voice mail messaging system for determining when to initiate forwarding of a stored message of said call.

13. The system for improved voice mail networking of claim 12, wherein the first user leaves a message on the first voice mail messaging system, the message being later sent to the second voice mail messaging system.

14. The system for improved voice mail networking of claim 13, wherein a voice mail message delivery telephone number is utilized to later send the message to the second voice mail messaging system.

15. The system for improved voice mail networking of claim 12, wherein the connecting means is a call processor.

16. The system for improved voice mail networking of claim 15, wherein the call processor is located in a PBX, the PBX being located within the second voice mail messaging system.

17. The system for improved voice mail networking of claim 12, wherein the automatic transferring of the telephone call to the first voice mail messaging system occurs only during a specified period of time.

18. The system for improved voice mail networking of claim 12, wherein the automatic transferring of the telephone call to the first voice mail messaging system occurs only when the first voice mail messaging system already has a message for the second voice mail messaging system.

19. The system for improved voice mail networking of claim 12, wherein the network is at least one of a public switching telephone network (PSTN) and a line.

20. The system for improved voice mail networking of claim 12 in which the automatic transferring to the first voice mail messaging system occurs when at least one of the following occurs: the first user selects to store the message at the first voice mail messaging system; a busy signal occurs; and the second user fails to answer the telephone.

21. A system for improved mail networking, comprising:

a first terminal, a first user being capable of placing a call from the first terminal;

a first site with a first mail messaging system, the first terminal being located in the first site and being coupled to the first mail messaging system;

a second terminal, the first user being capable of calling the second terminal via a network, the second terminal being associated with a second user;

a second site with a second mail messaging system, the second terminal being coupled to the second site and being coupled to the second mail messaging system;

connecting means for automatically transferring the call to the first messaging system rather than the second mail messaging system when a peer to peer protocol is supported and when at least one of a busy signal occurs and the second user fails to answer the second terminal; and a processor at the first mail messaging system for determining when to initiate forwarding of a stored message of the call.

22. The system for improved mail networking of claim 21, wherein the first user leaves a message on the first mail messaging system, the message being later sent to the second mail messaging system.

23. The system for improved mail networking of claim 22, wherein a mail message delivery number is utilized to later send the message to the second mail messaging system.

* * * * *